(12) United States Patent
Yi et al.

(10) Patent No.: US 6,478,428 B1
(45) Date of Patent: Nov. 12, 2002

(54) APPARATUS FOR PROJECTION DISPLAY USING REFLECTION TYPE LCD

(75) Inventors: Jong Su Yi, Suwon-Shi (KR); Dong Ha Kim, Suwon-Shi (KR); Yong Sik Moon, Seoul (KR); Kwang Joe Jeon, Suwon-Shi (KR); Jong Myung Park, Anyang-Shi (KR); Hark Lim Choi, Suwon-Shi (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 09/952,071

(22) Filed: Sep. 12, 2001

(30) Foreign Application Priority Data

Jul. 11, 2001 (KR) .................................. 2001-0041649

(51) Int. Cl.$^7$ .......................... G03B 21/14; G02B 5/30; G02B 27/28
(52) U.S. Cl. .......................... 353/20; 359/488; 359/496
(58) Field of Search .......................... 353/20, 30, 31; 349/5, 8, 9; 359/490, 496, 497, 500, 833, 487, 488, 489

(56) References Cited

U.S. PATENT DOCUMENTS 5,808,795 A * 9/1998 Shimomura et al. .......... 349/5
5,969,861 A * 10/1999 Ueda et al. .................. 359/485
6,183,091 B1 * 2/2001 Johnson et al. ................ 349/9
6,384,972 B1 * 5/2002 Chuang ...................... 348/756

* cited by examiner

Primary Examiner—Russell Adams
Assistant Examiner—Andrew Sever
(74) Attorney, Agent, or Firm—Darby & Darby

(57) ABSTRACT

Disclosed is an apparatus for projection display using reflection type LCDs. The apparatus for projection display using reflection type LCDs according to the invention comprises an illuminating device including a lamp and a polarizing element for illuminating S wave or P wave, a color splitter/synthesizer, including the reflection type LCDs for providing an image corresponding to an inputted image and converting a polarizing state of incident light when reflecting the light, a retarder stack for differentiating the polarized state of a predetermined color from the incident light, and polarizing beam splitters composed of a material having a photoelastic constant less than $0.03 \times 10^{-6}$ mm$^2$/N at a wavelength of 589.3 nm and a minimum transmittance higher than 90% in transmitting the thickness of 25 mm at a wavelength ranged 0.42 $\mu$m–0.70 $\mu$m for performing color split, color synthesis and analysis, and a projector for projecting the image passed through the color splitter/synthesizer onto a screen.

2 Claims, 4 Drawing Sheets

APPARATUS FOR PROJECTION DISPLAY USING REFLECTION TYPE LCD

BACKGROUND OF THE INVENTION

1. Field of the Invention

The present invention relates to an apparatus for projection display using liquid crystal displays (LCDs), and in particular, to an apparatus for projection display using LCDs that can be compacted by reducing the number of optical elements to be less than the conventional method of splitting and synthesizing colors by using an X-prism, and that safe performance of a projection display can be guaranteed by employing reflection type LCDs as a spatial light modulator (SLM).

2. Description of the Prior Art

With the recent trend of enlarging the scale of display, data projectors, projection TVs, projection monitors, etc. using a projection technology are being developed in a rapid speed. Recently, a reflection type LCD, which enhances aperture rates of a pixel by installing reflection type electrodes for each pixel, is employed in the projection display. The reflection type LCD is capable of enhancing aperture rate in comparison with the transparent LCD of the conventional type, and is suitable for projection display of high efficiency.

Unlike the conventional projection display using the transparent LCD, which employs a polarizing beam splitter (PBS) of a polarizer function and a PBS of an analyzer function, the projection display using the reflection type LCDs has both functions, thereby carrying an advantage of satisfying the need of compacting a system.

In applying the reflection type LCD, however, a single optical part has bi-functions of polarizer and analyzer. Therefore, the proportion of affecting the entire system by the performance of the part becomes fairly high. In particular, thermal stability of the part becomes problematic because about two times the optical energy than the method of using a transparent optical modulator passes through the optical part. The method conceived to solve this problem was to employ a material of high thermal stability for the optical part.

A method for dispersing the optical energy is to use one optical modulator and a color wheel. However, this method outputs only one of the R, G, B basic colors at one moment, thereby causing a principal optical loss of about 70%. Another method for dispersing the optical energy is to use a dichroic mirror before the illuminating light is incident to the optical modulator to separate the light into basic colors of R, G, B. The split light then works for the optical parts that have bi-functions of polizer and analyzer as well as to three reflection type optical modulators. This method has a problem of enlarging the system despite a satisfactory optical efficiency.

Under these circumstances, a need has arisen to conceive an apparatus for projection display using three reflection type optical modulators to enhance optical efficiency as well as a material of sufficient thermal stability while compacting a system by minimizing dispersion of the optical energy.

The outstanding prior art in this field is disclosed in U.S. Pat. No. 5,808,795.

In U.S. Pat. No. 5,808,795, three basic colors are split by a plate dichroic filter of X shape. The split colors are incident to three PBS groups for polarization, and modulated by three reflection type LCDs. The modulated light is synthesized by means of an X-prism, and projected to a screen through a projection lens. To remove deterioration of the quality of screen caused by an external or thermal stress, the PBS of the system is composed of a material having a photoelastic constant less than $1.5 \times 10^{-6}$ mm$^2$/N.

FIG. 1 is a diagram illustrating an apparatus for projection display according to the prior art. The following is a description of an operation made with reference to FIG. 1.

A white light emitted from a light source is divided into three components of R, G, B by a plate dichroic mirror 11. The description of the following process will be made with reference to the G component only because the optical parts operable for R, G, B components are similar to one another.

The G component is incident to a PBS 15G, which is in charge of pre-polarizing, by means of a mirror 12G. The component pre-polarized by the PBS 15G is re-polarized by a PBS 14G to face a reflection type LCD 13G. The G component modulated by the reflection type LCD 13G is analyzed by the PBS 14G to face an X-prism 17. Here, the PBS is composed of a material having a photoelastic constant less than $1.5 \times 10^{-8}$ cm$^2$/N.

The image synthesized with R, G, B components by the X-prism 17 is projected to a screen 200 through a projection lens 18.

Of the optical energy incident to the PBS, the energy absorbed to the PBS becomes a thermal stress of the PBS. An optical path difference ΔR which can estimate a degree of influence of the stress onto the performance of the PBS can be expressed by the following Equation 1.

Equation 1

$$\Delta R = (2\Pi/\lambda) \cdot \Delta n \cdot L = (2\Pi/\lambda) \cdot C \cdot \Delta\sigma \cdot L$$

Here, λ refers to a wavelength of the light, while Δn refers to an amount of birefringence. L refers to a thickness of the light path, and C refers to a photoelasticity of the material. Δσ refers to a difference between two principle stresses perpendicular to an optical axis.

Therefore, the conventional apparatus described above attempted to secure stability of a system and evenness of a screen by limiting the material of the PBS to have a photoelastic constant less than $1.5 \times 10^{-8}$ cm$^2$ /N.

However, the prior art splits colors by using a dichroic mirror of X shape, and operates one optical component of three colors into the PBS for the purpose of polarization and analysis. The material of low photoelasticity is used for the PBS in major wavelength of three basic colors. This means that less optical energy is required for one PBS in comparison with the present invention. Since the prior art requires optical elements for each basic color, however, the number of optical elements is increased, thereby escalating the cost and size of the product.

Also, the prior art uses glass of adjusted photoelasticity, which contains a predetermined content ratio of PbO. Such glass has a drawback of low transmittance in a short wavelength of a visible optical area. When the optical energy working for the PBS is increased, the optical energy absorbed by the PBS is increased as well. As a consequence, stress is increased and brightness uniformity cannot be secured despite low photoelasticity.

Thus, the conventional apparatus poses problems of resulting in a great number of optical elements while failing to secure a stable and brightness uniformity.

SUMMARY OF THE INVENTION

It is, therefore, an object of the present invention to provide an apparatus for projection display using reflection type LCDs that can be compacted by reducing the number of optical elements to be less than the conventional method of splitting and synthesizing colors by using an X-prism, and that safe performance of a projection display can be guaranteed by employing reflection type LCDs as an SLM.

To achieve the above objects, there is provided an apparatus for projection display using reflection type LCDs according to an embodiment of the present invention, comprising an illuminating device including a lamp and a polarizing element for illuminating S wave or P wave; a color splitter/synthesizer including the reflection type LCDs for providing an image corresponding to an inputted image and converting a polarizing state of incident light when reflecting the light, a retarder stack for differentiating the polarized state of a predetermined color from the incident light, and polarizing beam splitters composed of a material having a photoelastic constant less than $0.03 \times 10^{-6}$ mm$^2$/N at a wavelength of 589.3 nm and a minimum transmittance higher than 90% in transmitting the thickness of 25 mm at a wavelength ranged 0.42 $\mu$m–0.70 $\mu$m for performing color split, color synthesis and analysis; and a projector for projecting the image passed through the color splitter/synthesizer onto a screen.

The color splitter/synthesizer comprises:

a first retarder stack for differentiating and passing the polarized state of a predetermined color of the light, and passing the other colors of the light incident from the illuminating device; a first polarizing beam splitter for color splitting the light passed through the first retarder stack to transmit or reflect the same; a second polarizing beam splitter for transmitting the light passed through the first polarizing beam splitter to a first reflection type LCD, and analyzing the light reflected therefrom; a second retarder stack for differentiating and passing the polarized state of a predetermined color of the light reflected from the first polarizing beam splitter, and passing the other colors of the light; a third polarizing beam splitter for color splitting the light passed through the second retarder stack to transmit the same to the second and the third reflection type LCDs, and color synthesizing and analyzing the light reflected therefrom; a third retarder stack for differentiating and passing the polarized state of a predetermined color of the light synthesized by the third polarizing beam splitter, and passing the other colors of the light; a fourth polarizing beam splitter for synthesizing the light passed through the third retarder stack with the light analyzed by the second polarizing beam splitter; and a fourth retarder stack for differentiating and passing the polarized state of a predetermined color of the light synthesized by the fourth polarizing beam splitter, and passing the other colors of the light.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
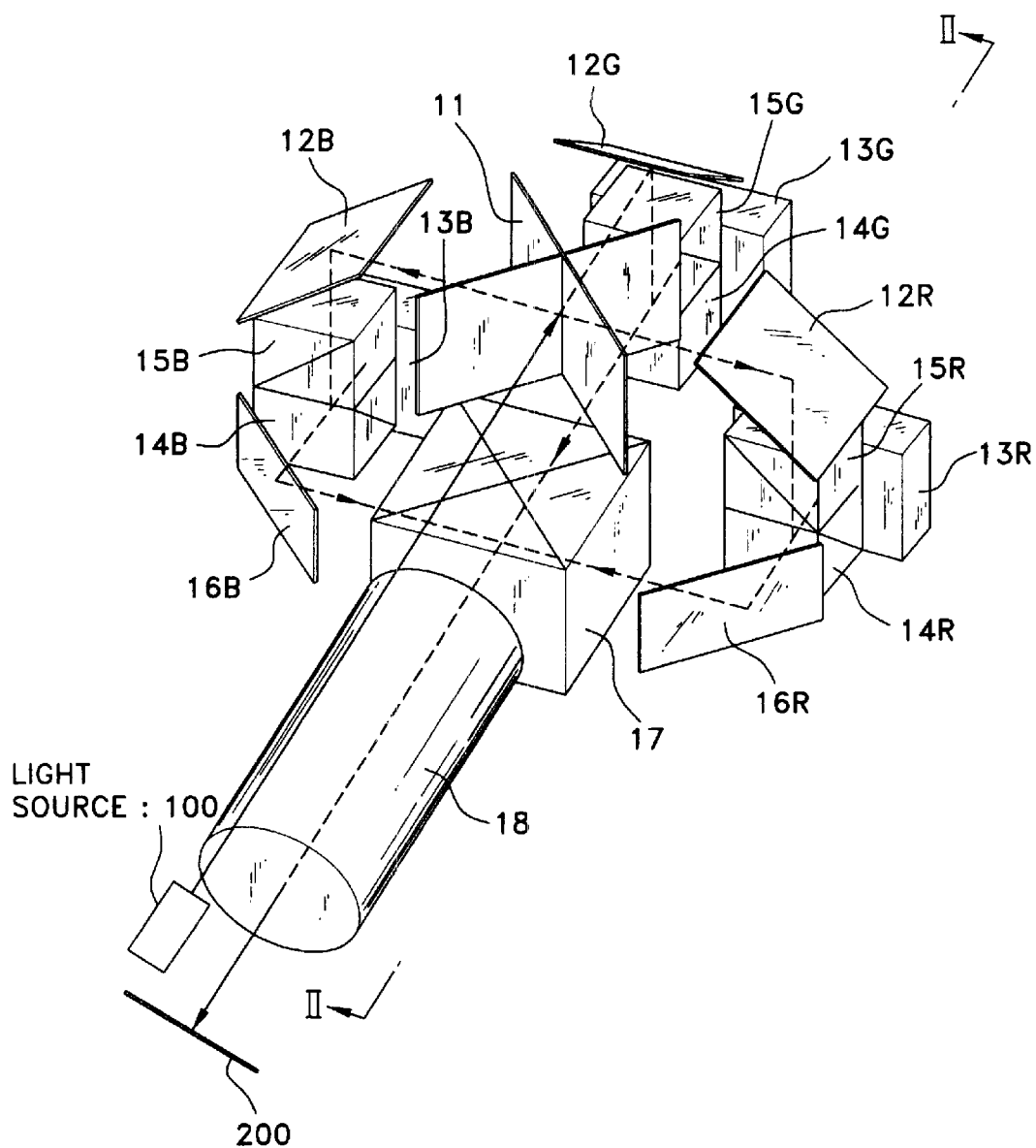
FIG. 1 is a diagram illustrating an apparatus for projection display according to the prior art.
Figure 2:
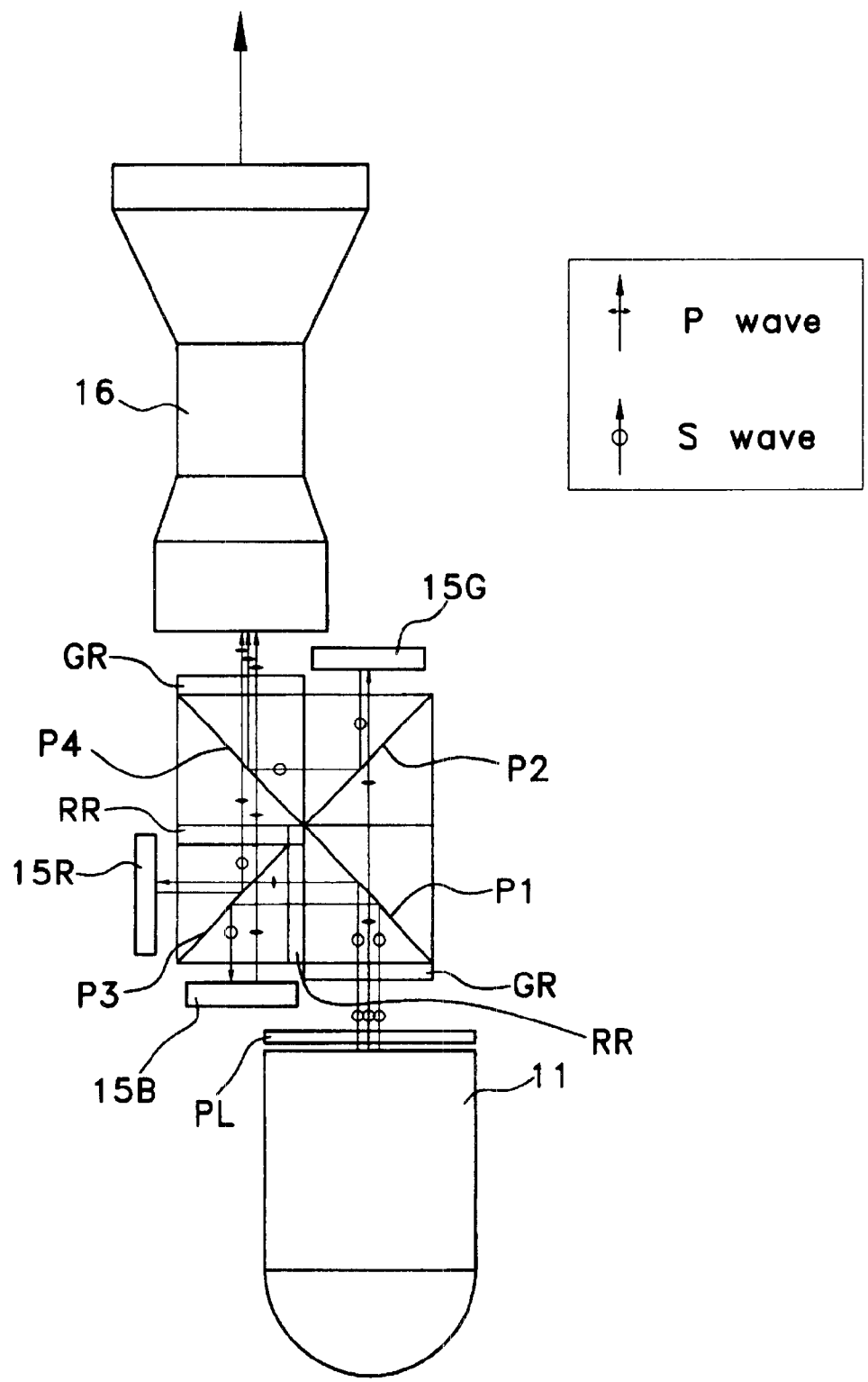
FIG. 2 is a diagram illustrating an apparatus for projection display using reflection type LCDs according to the present invention.

FIG. 2 is a diagram illustrating an apparatus for projection display using reflection type LCDs according to the present invention.

As shown in FIG. 2, the apparatus for projection display using reflection type LCDs comprises: an illuminating device having a lamp 11 and a polarizing plate PL for illuminating either one polarizing light of S wave or P wave; reflection type LCDs 15G, 15B, 15R for providing an image corresponding to the incident light component, and changing the polarizing state of the reflective light of the incident light; a retarder stack GR, RR. for differentiating the polarizing state in accordance with the color of the incident light; polarizing beam splitters P1 to P4 having a photoelastic constant less than $0.03 \times 10^{-6}$ mm$^2$/N at a wavelength of 589.3 nm and a minimum transmittance higher than 90% in transmitting the thickness of 25 mm at a wavelength ranged 0.42 $\mu$m–0.70 $\mu$m for splitting colors of the light illuminated by the illuminating device to orient the reflection type LCDs 15G, 15B, 15R, and simultaneously performing color synthesis and analysis of the light reflected from the reflection type LCDs 15G, 15B, 15R; and a projector 16 for projecting an image passed through the polarizing beam splitters P1 to P4 onto a screen.

In the first, the second and the fourth polarizing beam splitters P1, P2, P4 of the polarizing beam splitters, the green light converted from S wave to P wave by the green retarder stack GR is transmitted by the first polarizing beam splitter P1, and incident and transmitted by the second polarizing beam splitter P2 so as to be incident to the reflection type LCD 15G. The reflection type LCD 15G modulates and reflects the incident light in a polarizing state corresponding to an image signal. P wave of the reflective light modulated by the second polarizing beam splitter P2 is transmitted and returned by following the path incident to the reflection type LCD 15G, while the reflected S wave is incident to the fourth polarizing beam splitter P4. A magenta light, which is S wave reflected by the first polarizing beam splitter P1, orients a red retarder stack RR.

In the first, the third and the fourth polarizing beam splitters P1, P3, P4 of the polarizing beam splitters, the magenta light of S wave reflected by the first polarizing beam splitter P1 orients the red retarder stack RR. The red component of the magenta light rotates 90° by the red retarder stack so as to be converted to P wave from S wave. The blue component of the magenta light maintains the polarized component thereof to be the same as the incident state. Of the light transmitted by the red retarder stack RR, a red light of P wave is transmitted by the third polarizing beam splitter P3, and incident to the reflection type LCD 15R. The polarized state of the red light is modulated and reflected by the image signal. The S component of the red light reflected by the reflection type LCD 15R is reflected by the third polarizing beam splitter P3, and converted to P wave by another red retarder stack RR to orient the fourth polarizing beam splitter P4. The P component of the red light is transmitted by the third polarizing beam splitter P3, and returned by following the incident path. The blue light of S wave split from the red component by the third polarizing beam splitter P3 orients the reflection type LCD 15B by means of the third polarizing beam splitter P3. The polarized blue light is modulated and reflected by the reflection type LCD 15B in accordance with the image signal. The reflected blue light of P wave is incident to the fourth polarizing beam splitter P4 without being polarized by the red retarder stack between the third polarizing beam splitter P3 and the fourth polarizing beam splitter P4. The blue light of S wave is reflected by the third polarizing beam splitter P3, and returned by following the incident path.

In the fourth polarizing beam splitter P4 of the polarizing beam splitters, the green light of S wave incident to the fourth polarizing beam splitter P4 is reflected by the fourth polarizing beam splitter P4. The red and blue lights of P wave are transmitted by the fourth polarizing beam splitter P4 so as to be synthesized as a color image. Polarization of the green component including the color image rotates 90° by the green retarder stack GR, and the other components maintain P wave so that all the components can be P wave and projected onto the screen by the projection lens of the projector 16.

According to the prior art, one of the optical components of the three basic colors works for the PBS for the purpose of polarization and analysis after splitting the colors by using a dichroic mirror of X shape. This means that the optical energy working for a single PBS according to the prior art can be less than that working for the present invention. Since the prior art requires optical elements for each of the basic colors, however, the number of required elements is increased, thereby increasing the cost and size of the product.

Further, the prior art uses the glass of adjusted photoelasticity, which contains a predetermined content ratio of PbO. Such glass has a drawback of low transmittance in a short wavelength of a visible optical area.

Figure 3:
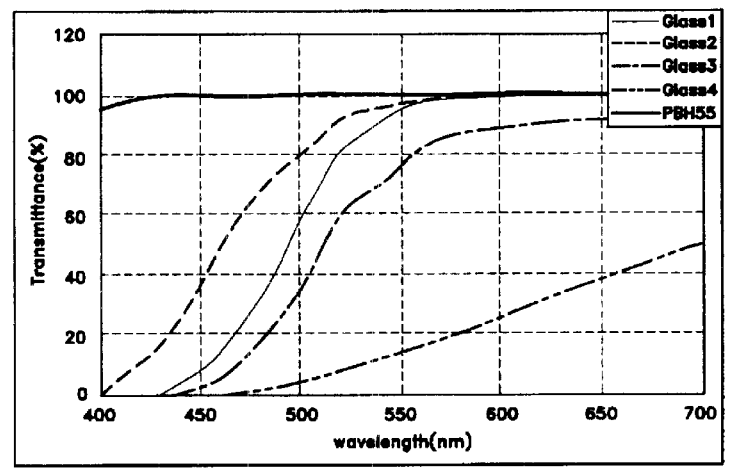
FIG. 3 is a graph comparing material characteristics of the PBS between the prior art and the present invention.

FIG. 3 is a graph comparing material characteristics of the PBS between the prior art and the present invention.

Glass 1 in FIG. 3 is comprised of PbO of 60 mole % and $SiO_2$ of 40 mole %. In addition to $SiO_2$ of 40 mole %, glass 2 is further comprised of PbO+$As_2O_3$ of 0.2 mole %, while glass 3 is further comprised of $PbO_2$+$As_2O_3$ of 0.2 mole %. Glass 4 is further comprised of PbO+$Sb_2O_3$ of 0.2 mole %.

If the content of PbO of the glass is high, the [$PbO_4$] tetrahedron is increasingly formed to work as a mesh structure formant. Therefore, a balanced state of $PB^{2+}$/$Pb^{4+}$ is formed depending on the concentration of PbO. However, $PbO_2$ is formed by $Pb^{4+}$ to lower transmittance. As in case of glass 2, $As_2O_3$ heightens transmittance of the lead glass due to absorption of oxygen and transformation into $As_2O_5$.

On the other hand, an antimony oxide such as glass 4 lowers transmittance of the glass due to formation of an antimony lead. Formation of an antimony lead affects the color of the image projected by coloring the glass. Furthermore, absorption of heat by the prism following the absorption of light increases the difference Δσ between the two principal stresses perpendicular to the optical axis. The glass of high transmittance such as SF2 exposes an outstanding double refraction. However, the lead glass according to the prior art can hardly be considered to have an improved transmittance because [$As_2O_3$+$Sb_2O_3$] has been added thereto. Moreover, if the great amount of optical energy as in case of the present invention works for the PBS, quality of screen cannot be guaranteed.

The lead glass of improved transmittance is already avaiable for commercial use. Examples are SF57 improved internal transmittance of Scott Corporation and PBH55 of Ohara Corporation. The SF57 improved internal transmittance has a photoelastic constant of $0.02 \times 10^{-6}$ $mm^2/N$ at a wavelength of 589.3 nm, while the PBH55 of Ohara Corporation has a photoelastic constant of $0.03 \times 10^{-6}$ $mm^2/N$ at a wavelength of 589.3 nm. The present invention employs the PBS of this kind.

Figure 4:
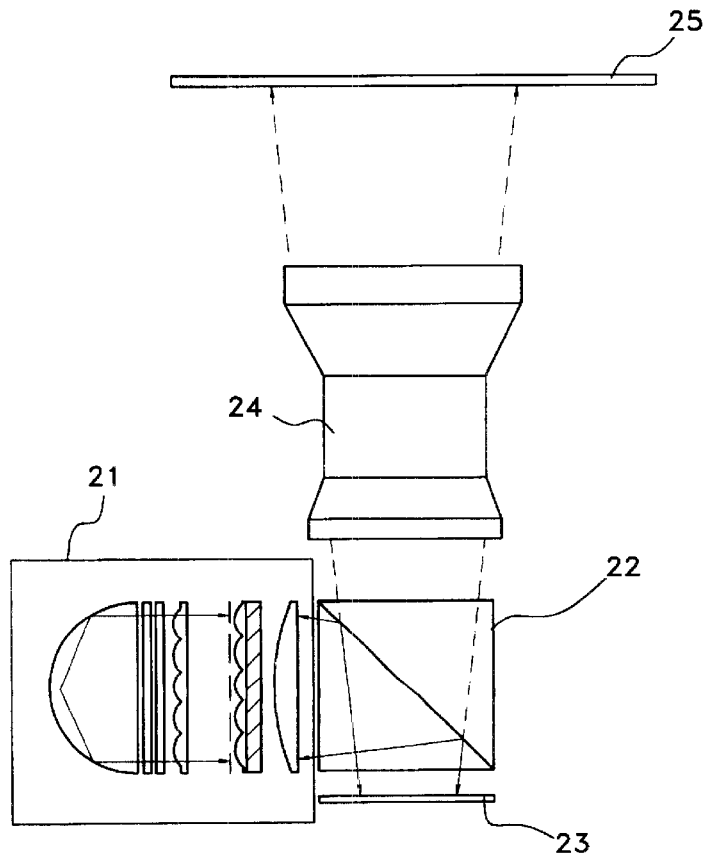
FIG. 4 is a diagram illustrating an apparatus for measuring an influence of double refraction caused by optical absorption according to the present invention.

FIG. 4 is a diagram illustrating an apparatus for measuring an influence of double refraction caused by optical absorption according to the present invention.

FIG. 4 shows how the brightness uniformity of the light projected at the center and around corners of the screen is varied in accordance with elapse of time through measurement of brightness by a photometer.

Table 1 below shows characteristics of the base materials of the used PBS samples.

TABLE 1

| Material | SF2 | SF6 | SF57 | SF57 Improved Internal Transmittance |
|---|---|---|---|---|
| Refractive Index | 1.648 | 1.805 | 1.847 | 1.847 |
| 25 mm Transmittance at 420 nm | 98.3% | 91% | 85% | 91% |
| Photoelastic Constant at 589.3 nm | $2.62 \times 10^{-6}$ $mm^2/N$ | $0.65 \times 10^{-6}$ $mm^2/N$ | $0.02 \times 10^{-6}$ $mm^2/N$ | $0.02 \times 10^{-6}$ $mm^2/N$ |

Figure 5:
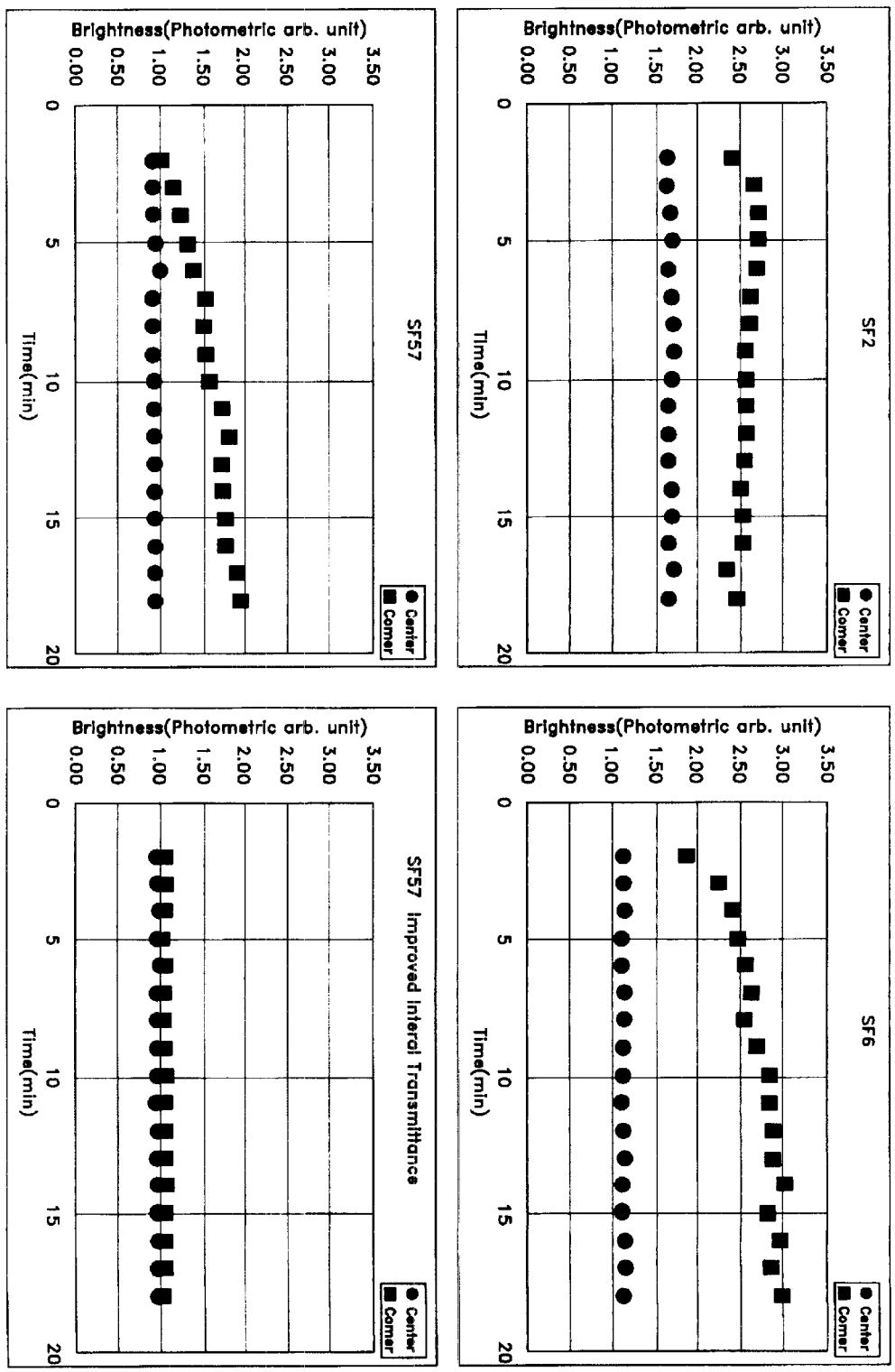
FIG. 5 is a graph comparing brightness uniformity of the PBS between the prior art and the present invention.

FIG. 5 is a graph comparing brightness uniformity of the PBS between the prior art and the present invention when the samples in Table 1 are used as PBS in the measuring apparatus in FIG. 4.

Here, the drawing reference numeral 21 represents an illuminating device using a lamp of UHP 100 W. The illuminating device 21 illuminates light of S wave at f/3 of a rectangular shape at a wavelength ranged 420–700 mm. The drawing reference numeral 22 represents a sample PBS, while the drawing reference numeral 23 represents a mirror. The drawing reference numeral 24 represents a projection lens protected at f/3, and the drawing reference numeral 25 represents a screen.

The light emitted from the illuminating device 21 is reflected by the PBS 22 to be S wave, and incident to the mirror 23, and reflected again. The reflected light is once again reflected by the PBS 22 to return to the illuminating device 21. At this stage, most of the optical energy exists on the side of the illuminating device of the prism constituting the PBS 22, thereby causing a temperature difference between the illuminating device 21 and the projection lens. Because of the double refraction caused by the temperature difference, a projecting light orienting the projection lens is generated.

FIG. 5 shows that SF6 having a lower photoelastic constant discloses a lower brightness uniformity in accordance with elapse of time than SF2 having a higher photoelastic constant. FIG. 5 also shows that SF57 having a far lower photoelastic constant discloses a lower brightness uniformity in accordance with elapse of time.

On the other hand, the SF57 improved internal transmittance discloses stable characteristics. This material has a high transmittance in a small photoelastic constant and a short wavelength region.

As shown in FIG. 3, absorption of the optical energy by the lead glass is mostly conducted in a short wavelength region. Therefore, stress is generated due to a dispersion difference of optical energy in the process of reflecting blue color and splitting the same by the PBS, which splits or syntnesizes according to the present invention. Also, as shown in FIG. 5, the glass of sufficiently small photoelastic constant and high transmittance generates less stress. The double refraction generated by the small photelastic constant may be ignored.

Thus, the present invention not only has reduced the number of optical elements by diversifying the functions of a single PBS into color split/synthesis and. analysis but also has secured stability of the PBS by employing the base material thereof having a photoelastic constant less than $0.03 \times 10^{-6}$ mm$^2$/N at a wavelength of 589.3 nm and a minimum transmittance higher than 90% in transmitting the thickness of 25 mm at a wavelength ranged 0.42 $\mu$m–0.70 $\mu$m.

Therefore, the apparatus for projection display using reflection type LCDs according to the present invention is compacted by reducing the number of optical elements to be less than the conventional method of splitting and synthesizing colors by using an X-prism, and that safe performance of a projection display can be guaranteed by employing reflection type LCDs as an SLM.

As described above, the present invention has advantageous effects of compacting the apparatus for projection display by reducing the number of optical elements to be less than the conventional method of splitting and synthesizing colors by using an X-prism, and that safe performance of a projection display can be guaranteed by employing reflection type LCDs as an SLM.

In addition, the present invention realized an apparatus for projection display with less number of optical elements than those employed in the prior art by enabling the PBS to simultaneously perform the functions of color split/synthesis and analysis. Such constructional advantages further result in the effects of reducing the size of the projection display and lowering the cost thereof.

The present invention has another advantage of securing a brightness uniformity by employing a material of the PBS having a photoelastic constant less than $0.03 \times 10^{-6}$ mm$^2$/N at a wavelength of 589.3 mm and a minimum transmittance higher than 90% in transmitting the thickness of 25 mm at a wavelength ranged, 0.42 $\mu$m–0.70 $\mu$m.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for projection display using reflection type LCDs, comprising:

an illuminating device including a lamp and a polarizing element for illuminating S wave or P wave;

a color splitter/synthesizer including the reflection type LCDs for providing an image corresponding to an inputted image and converting a polarizing state of incident light when reflecting the light, a retarder stack for differentiating the polarized state of a predetermined color from the incident light, and polarizing beam splitters composed of a material having a photoelastic constant less than $0.03 \times 10^{-6}$ mm$^2$/N at a wavelength of 589.3 nm and a minimum transmittance higher than 90% in transmitting the thickness of 25 mm at a wavelength ranged 0.42 $\mu$m–0.70 $\mu$m for performing color split, color synthesis and analysis; and a projector for projecting the image passed through the color splitter/synthesizer onto a screen.

2. The apparatus of claim 1, wherein the color splitter/synthesizer comprises:

a first retarder stack for differentiating and passing the polarized state of a predetermined color of the light, and passing the other colors of the light incident from the illuminating device;

a first polarizing beam splitter for color splitting the light passed through the first retarder stack to transmit or reflect the same;

a second polarizing beam splitter for transmitting the light passed through the first polarizing beam splitter to a first reflection type LCD, and analyzing the light reflected therefrom;

a second retarder stack for differentiating and passing the polarized state of a predetermined color of the light reflected from the first polarizing beam splitter, and passing the other colors of the light;

a third polarizing beam splitter for color splitting the light passed through the second retarder stack to transmit the same to the second and the third reflection type LCDs, and color synthesizing and analyzing the light reflected therefrom;

a third retarder stack for differentiating and passing the polarized state of a predetermined color of the light synthesized by the third polarizing beam splitter, and passing the other colors of the light;

a fourth polarizing beam splitter for synthesizing the light passed through the third retarder stack with the light analyzed by the second polarizing beam splitter; and a fourth retarder stack for differentiating and passing the polarized state of a predetermined color of the light synthesized by the fourth polarizing beam splitter, and passing the other colors of the light.

* * * * *